B. H. SHARP & F. J. BENDER.
LIQUID COOLING APPARATUS.
APPLICATION FILED JULY 27, 1916.
1,248,179.
Patented Nov. 27, 1917.
2 SHEETS—SHEET 1.
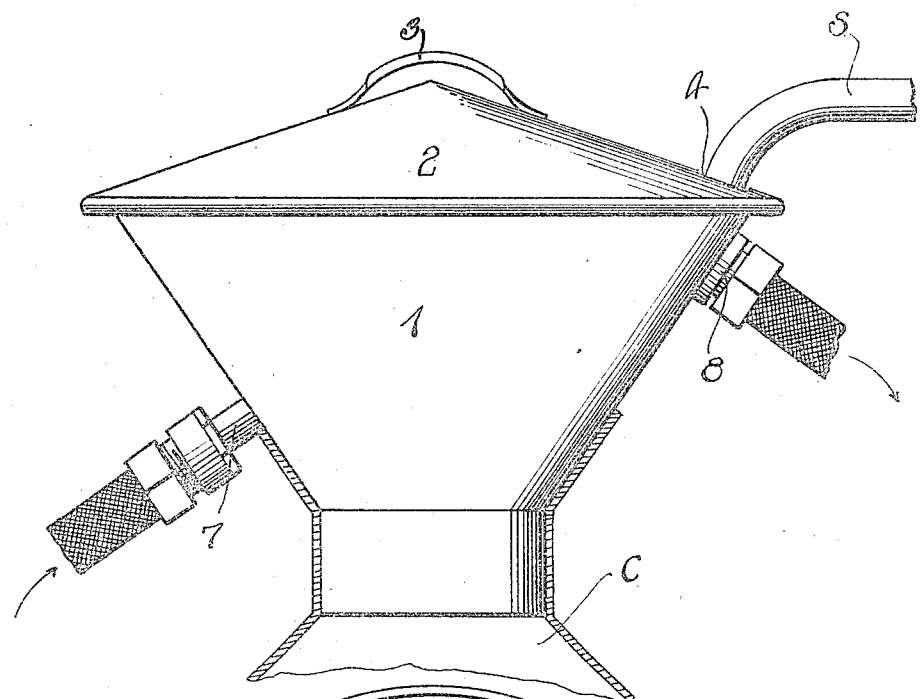
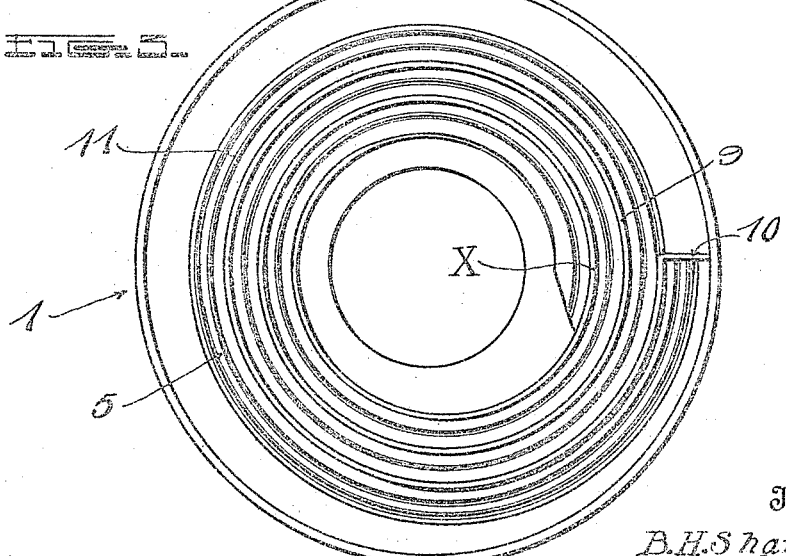
Witness
George W. Giovannetti
Inventors
B. H. Sharp
and
F. J. Bender
By H. A. Wilson & Co.
Attorneys

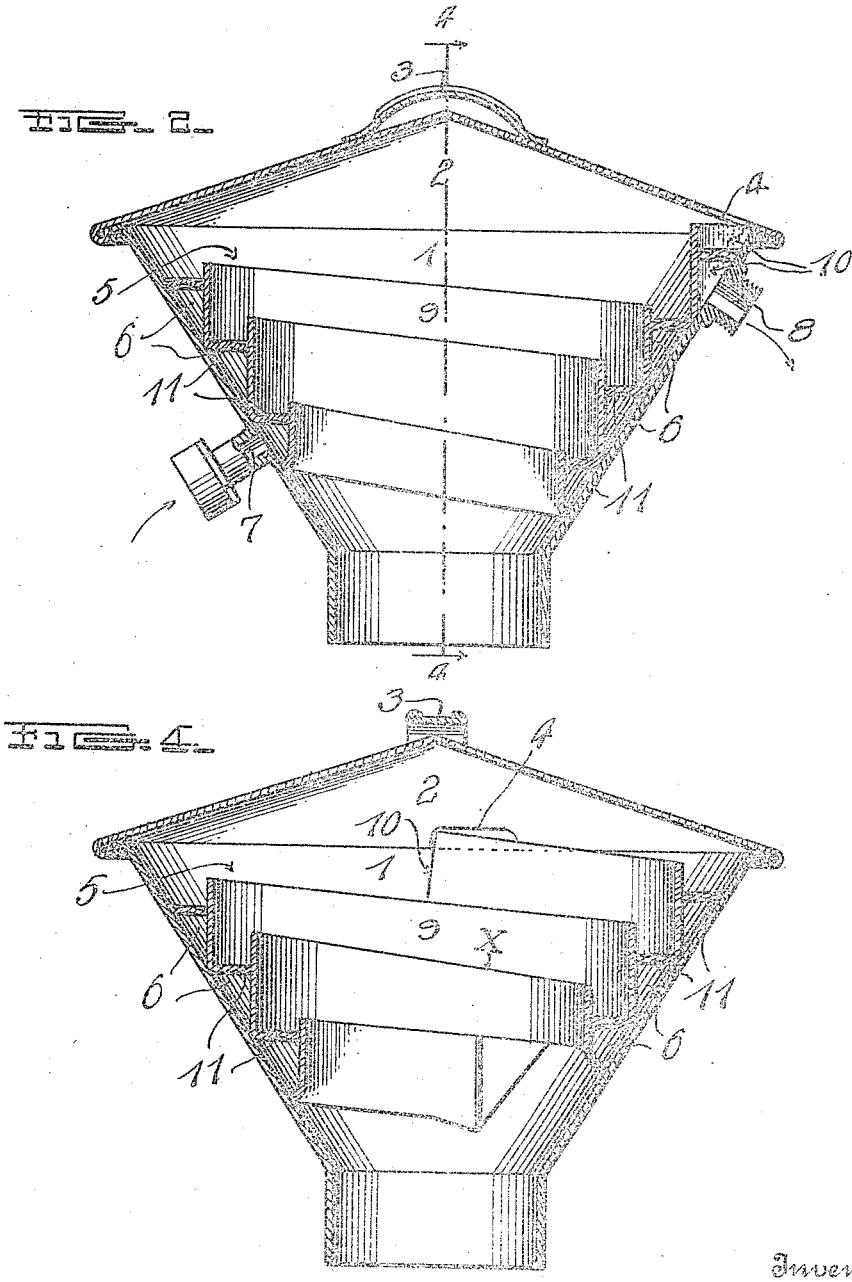

UNITED STATES PATENT OFFICE.

BERNAL H. SHARP AND FRANK J. BENDER, OF WOODLAND, CALIFORNIA.

LIQUID-COOLING APPARATUS.

1,248,179.　　　　　　Specification of Letters Patent.　　　Patented Nov. 27, 1917.

Application filed July 27, 1916.　Serial No. 111,696.

*To all whom it may concern:*

Be it known that we, BERNAL H. SHARP and FRANK J. BENDER, citizens of the United States, residing at Woodland, in the county of Yolo and State of California, have invented certain new and useful Improvements in Liquid-Cooling Apparatus; and we do declare the following to be a full, clear, and exact description of the invention, such as will enable others skilled in the art to which it appertains to make and use the same.

This invention relates to liquid coolers and more particularly to cream cooling apparatus.

The main object of the invention is to provide a simple and efficient device of this character adapted to be supported by an ordinary milk shipping can or other receptacle and which will thoroughly cool a liquid during its passage therethrough.

Another object is to provide a device of this character in which an extended cooling surface is provided and in which the effect of the cooling medium is greater at the discharge than at the entrance of the cooler.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:

Figure 1 represents a side elevation of a cooling apparatus constructed in accordance with this invention shown applied to a milk can;

Fig. 2 is a vertical section through the cooling apparatus;

Fig. 3 is a plan view with the top removed; and

Fig. 4 is a central vertical section taken in a plane at right angles to Fig. 2 on the line 4—4 of Fig. 2.

In the embodiment illustrated, this invention consists of a funnel-shaped body portion 1 composed of block tin or any suitable material and designed to be supported by the mouth of a milk shipping can indicated in part at C. This body portion is provided with a removable cover 2 which is preferably in the form of a hollow cone having a handle 3 at its apex and an elongated opening 4 near its edge through which the milk or other liquid to be cooled enters the cooler. This device is shown especially designed to be used in connection with a milk separator, the discharge spout S of which is shown supported above the upper end of the cooler and discharging through the opening 4 in the top thereof.

A helical trough 5 is arranged on the inner face of the body 1 with a cooling chamber 6 arranged between it and the body and which is designed to receive a cooling medium which is fed into the chamber at the lower end thereof through an inlet 7 and discharged at its upper end through an outlet 8. It is to be understood that any suitable cooling medium may be employed, preferably flowing water.

The larger portion of the helical trough 5 is arranged at the upper end of the body 1 and this trough is formed by securing one edge of a metal strip 9 to the inner face of said body which may be accomplished by brazing or in any other suitable manner. The side walls of the trough 5 and chamber 6 formed by the body 1 and strip 9 diverge toward their upper edges. This strip 9 is secured at its upper end adjacent the upper edge of the body 1 and a V-shaped or triangular plate 10 connects the terminal thereof to said body portion and forms an end closure for both the trough 5 and the cooling chamber 6. The strip at this end projects above the plane of the upper edge of the body portion to prevent the overflow of the liquid which is directed into the cooler at this point through the opening 4 in the cover 2 which is arranged directly over this end of the trough when in operative position.

A partition 11 forms the bottom of the trough 5 and is corrugated longitudinally to afford an extended cooling area and also forms the top of the cooling chamber, and the outer wall of the trough formed by the strip 9 decreases in depth from the point marked X to the lower end of said trough which is caused by positioning the bottom 11 nearer the upper edge of said strip and thereby increasing the depth of the cooling chamber which is arranged below said bottom. It will thus be seen that the lower or inlet end of the cooling chamber is of greater depth than its upper end and thereby accommodates a larger quantity of the cooling medium at this point so that as the cream or other liquid nears its discharge, the cooling effect thereon will be increased. Thus the liquid when it leaves the trough and flows into the receiving receptacle below, will be thoroughly cooled having been subjected throughout its travel around the helical trough to the cooling effect of the inflowing cooling medium which passes upwardly through said chamber from the lower end thereof to the upper end in a direction opposite to the travel of the liquid to be cooled.

From the above description, it will be obvious that the cream or other liquid entering the cooler through the opening 4 in the top thereof will flow in a spiral path around the inner face of the body 1 and during its passage will contact with two cooling surfaces provided by the inner wall and bottom of the trough through which the liquid flows. The top 2 protects the liquid being cooled from dust and the like, and may be readily removed for cleaning and other purposes. The trough 5 is shown terminating at its lower end some distance from the lower end of the funnel-shaped body, but obviously it may extend around the entire inner face thereof.

We claim:—

A funnel-shaped body having a strip helically arranged therein and secured at its lower edge to the inner face of said body and with its other edge diverging therefrom, a horizontal partition arranged between the top and bottom edges of the strip and having one edge thereof contacting with said strip, the other edge of said partition resting against the inner face of said body in a line coincident with the line of contact of the lower edge of the helical strip, thereby forming a trough with a cooling chamber below it.

In testimony whereof we have hereunto set our hands in the presence of two subscribing witnesses.

BERNAL H. SHARP.
FRANK J. BENDER.

Witnesses:
ELSIE L. SMITH,
G. P. HURST.

Copies of this patent may be obtained for five cents each, by addressing the "Commissioner of Patents. Washington, D. C."